Aug. 4, 1953 H. H. O. GRIESHAMMER 2,647,554
HYDRAULICALLY OPERATED VULCANIZING PRESS
Filed Sept. 1, 1950 8 Sheets-Sheet 5
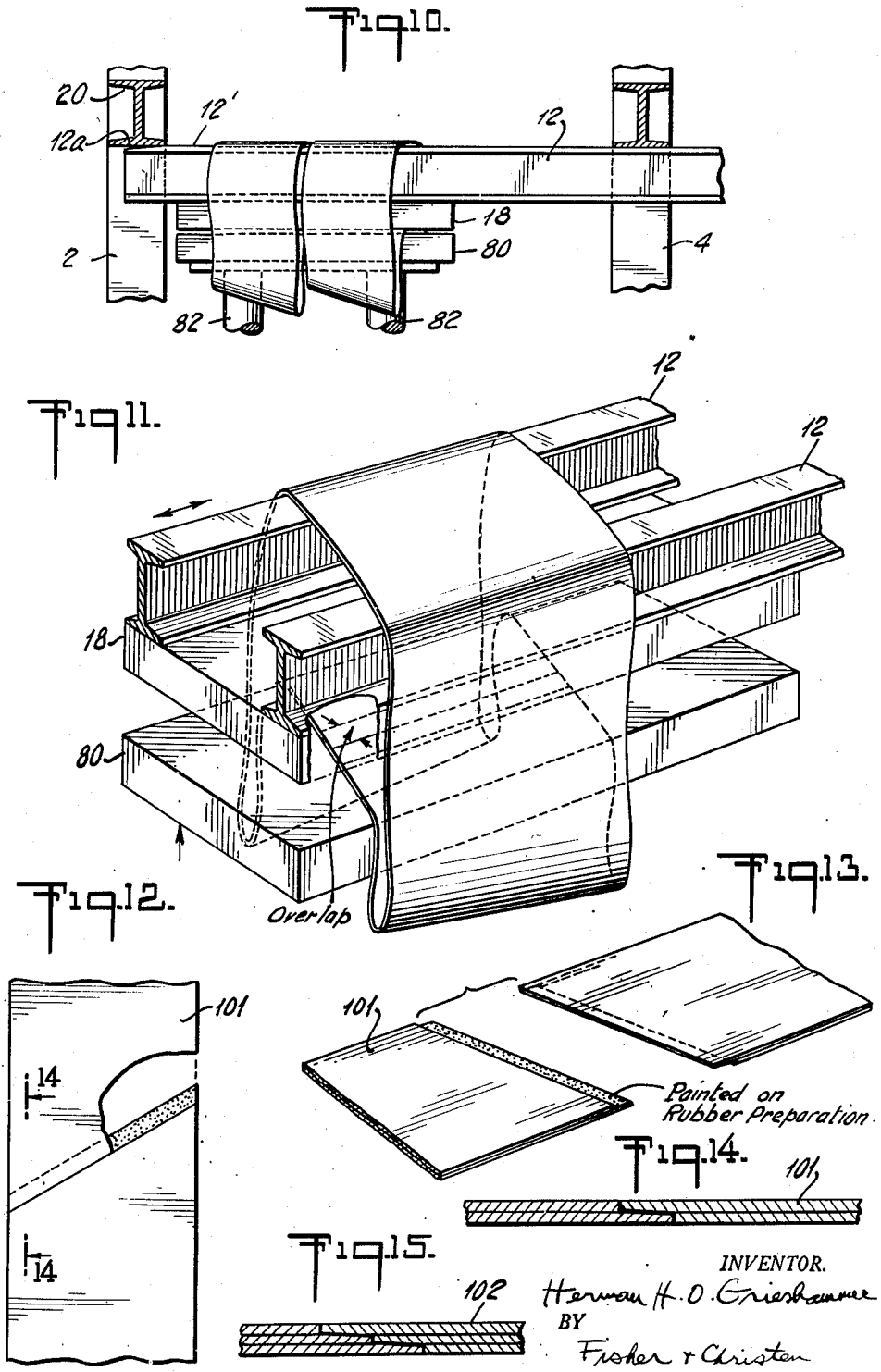
INVENTOR.
Herman H. O. Grieshammer
BY
Fisher & Christen
ATTORNEYS Aug. 4, 1953   H. H. O. GRIESHAMMER   2,647,554
HYDRAULICALLY OPERATED VULCANIZING PRESS
Filed Sept. 1, 1950   8 Sheets-Sheet 6
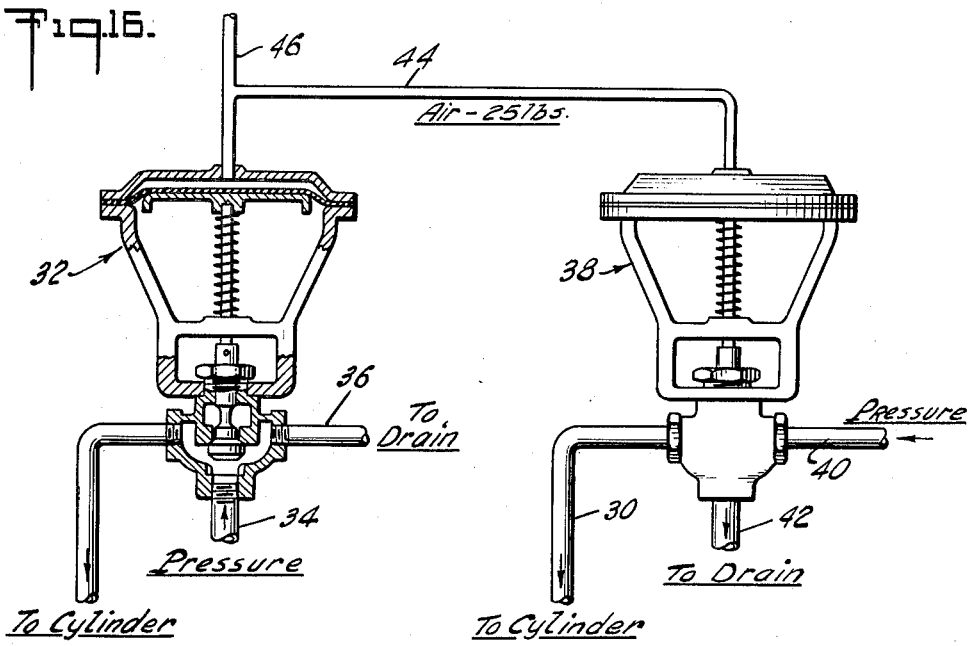
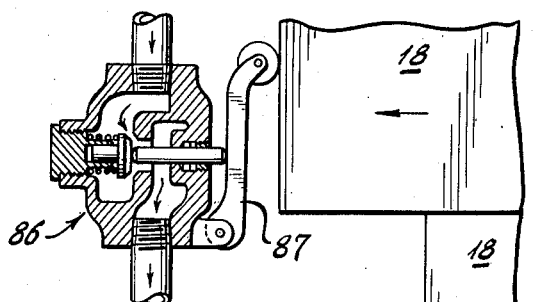
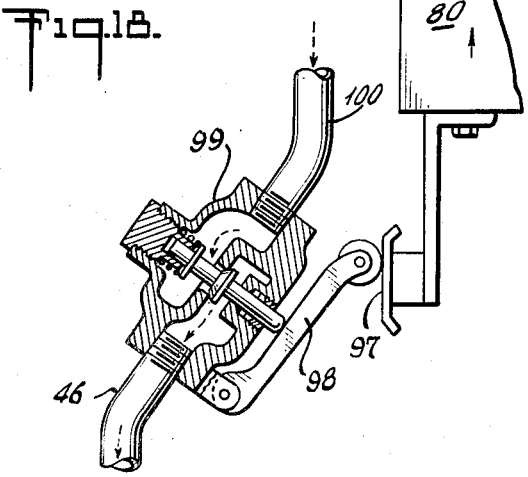
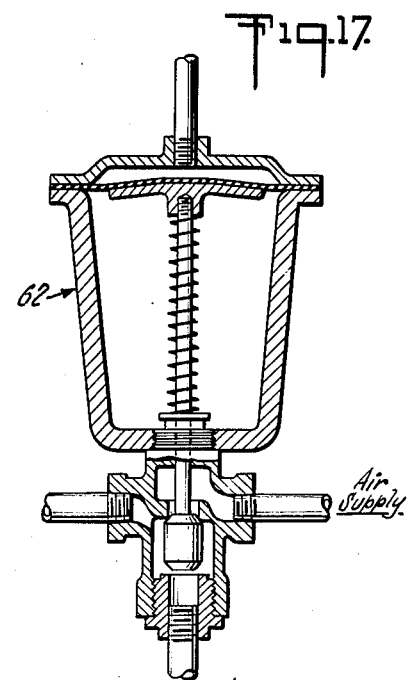
INVENTOR
Herman H. O. Grieshammer
BY
Fisher & Christen
ATTORNEYS

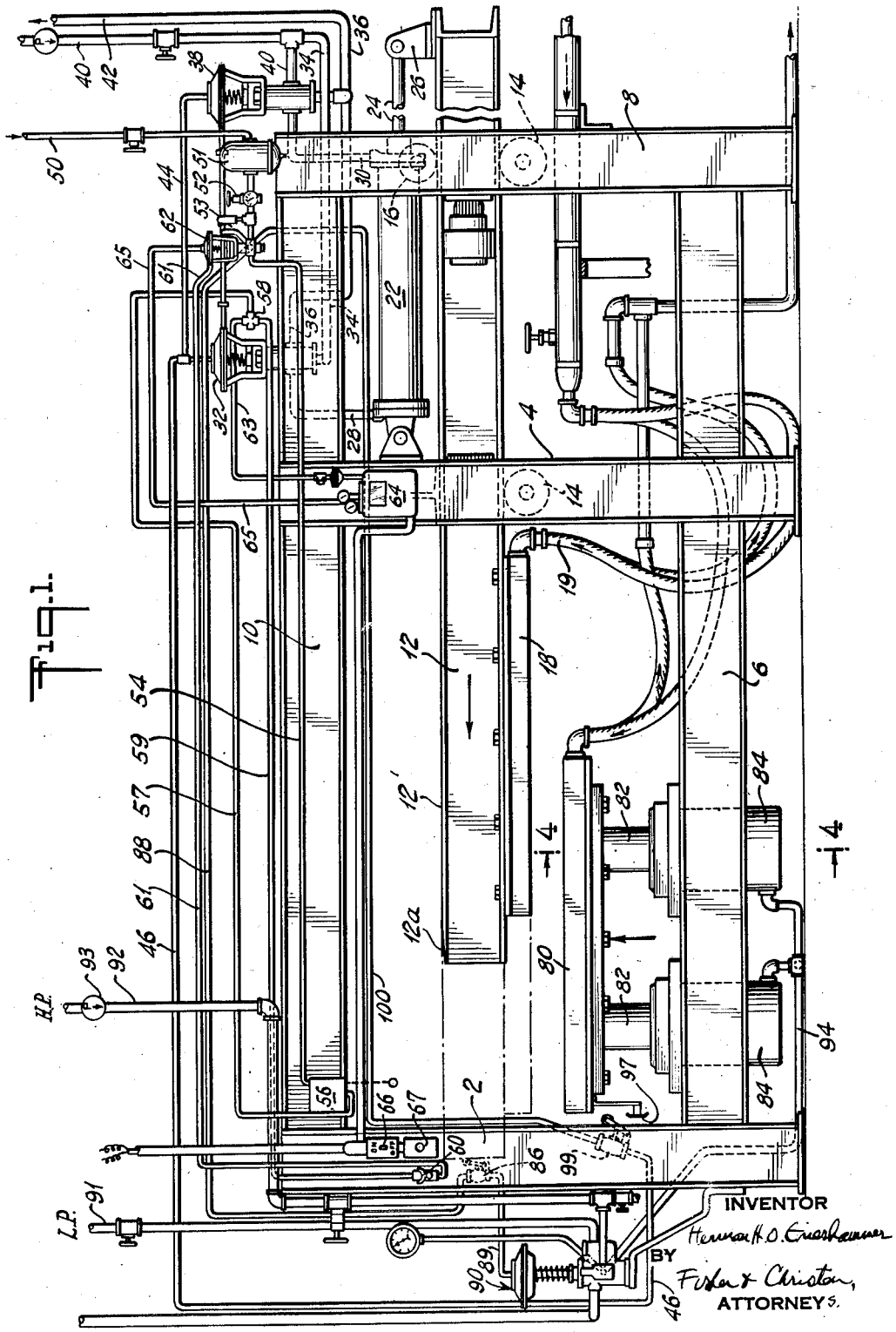

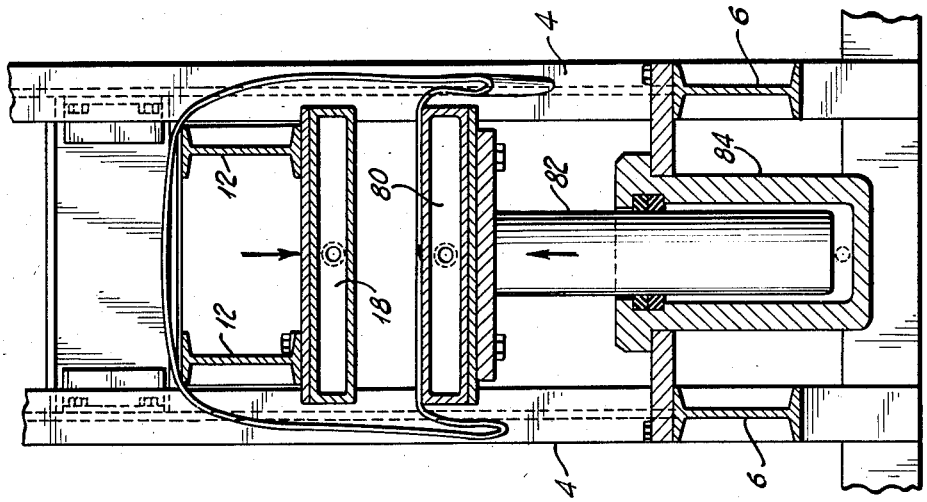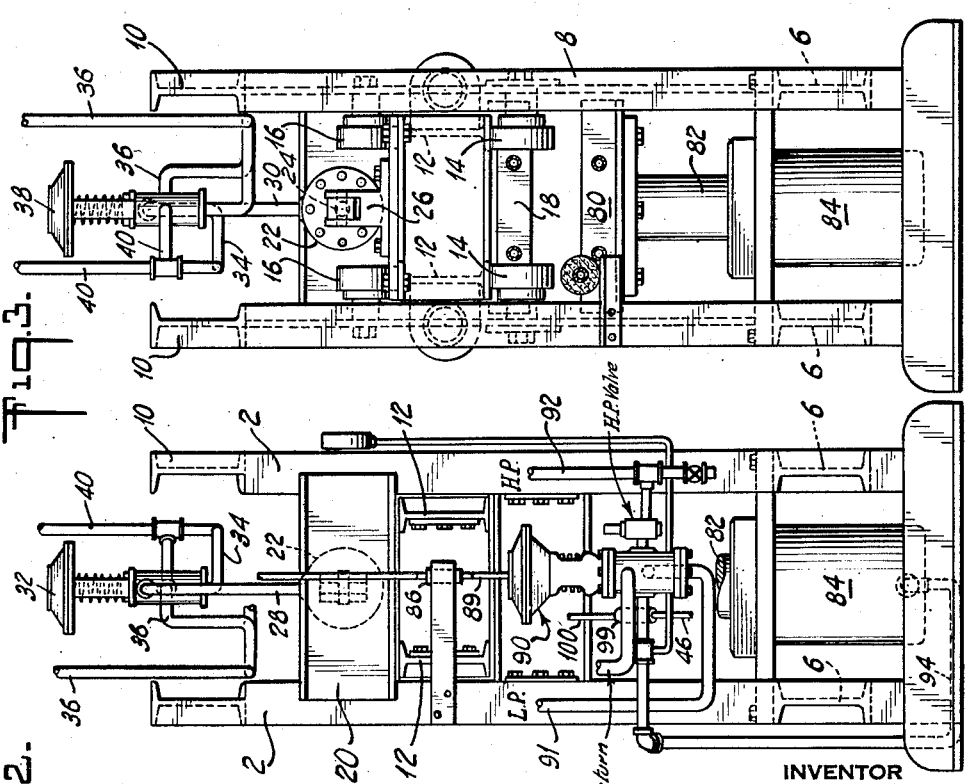

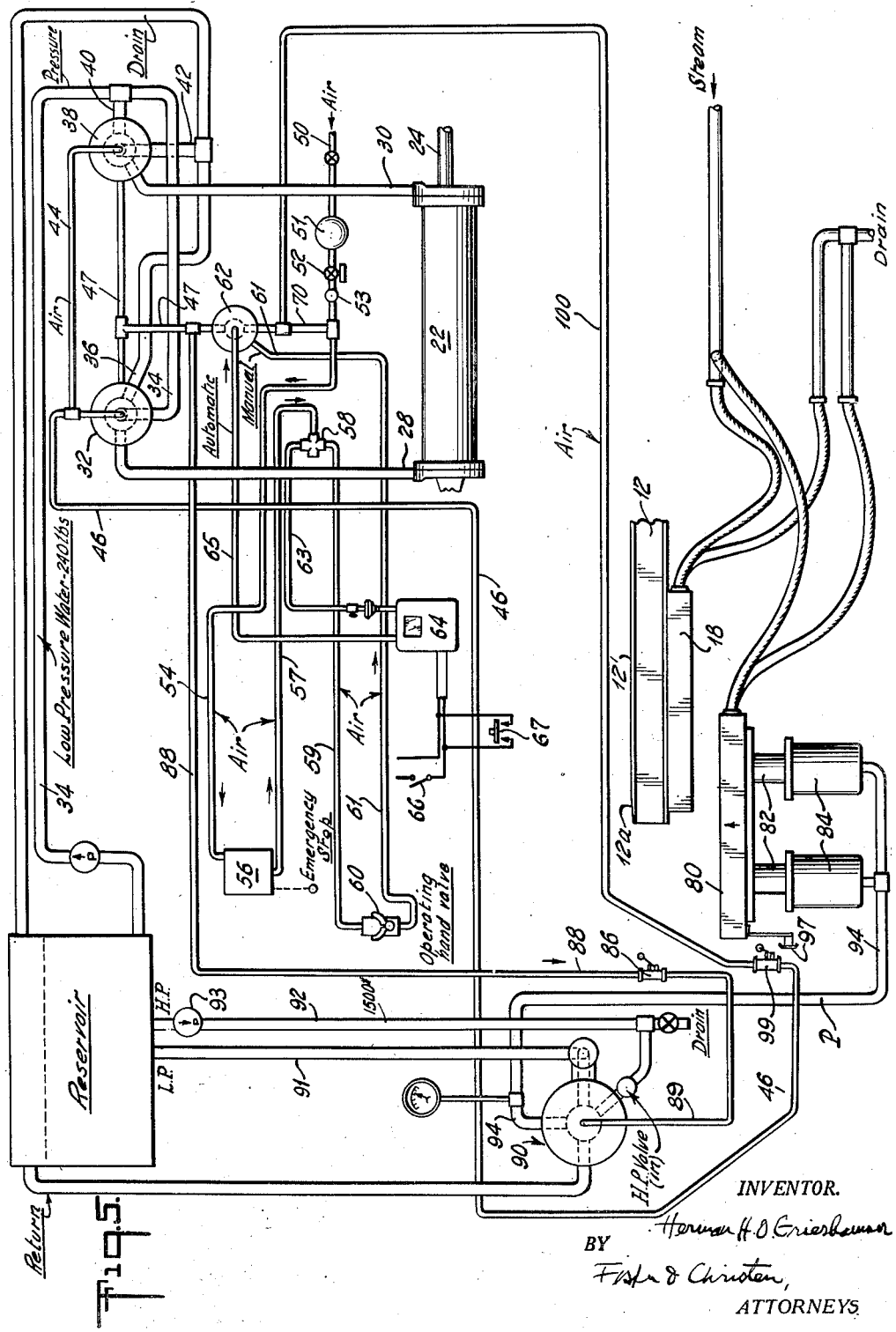

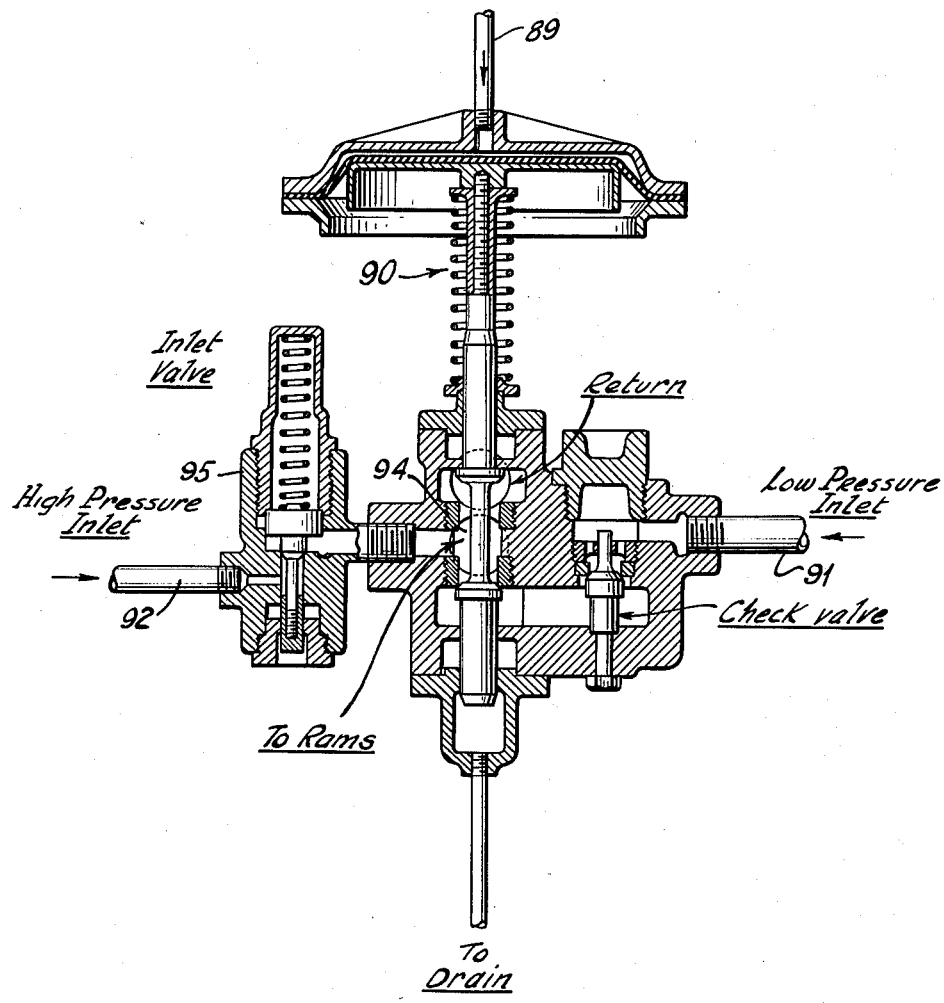

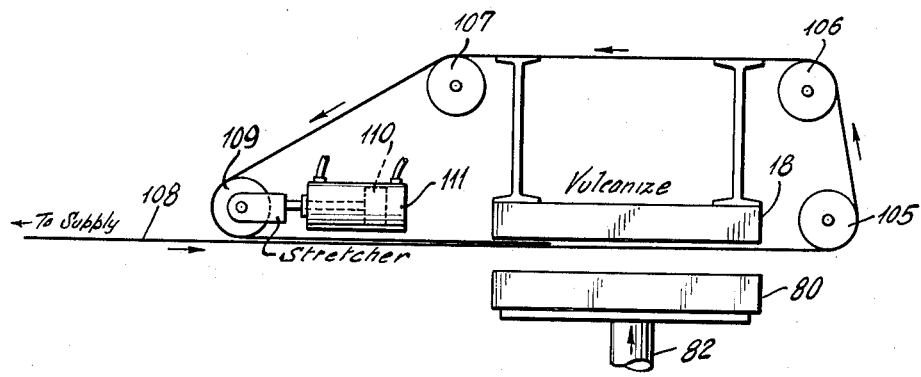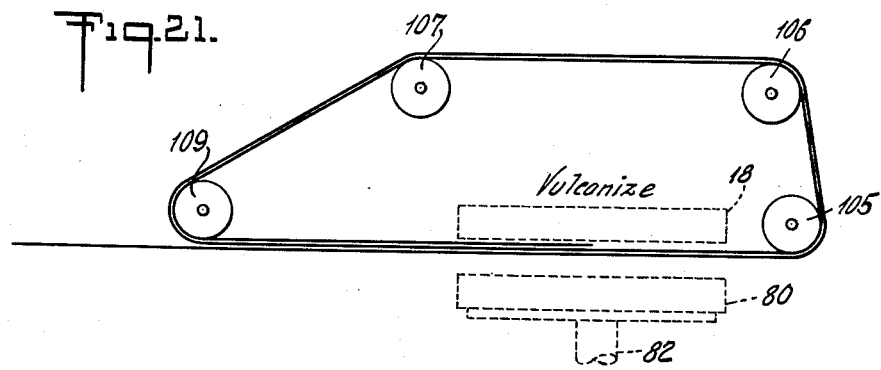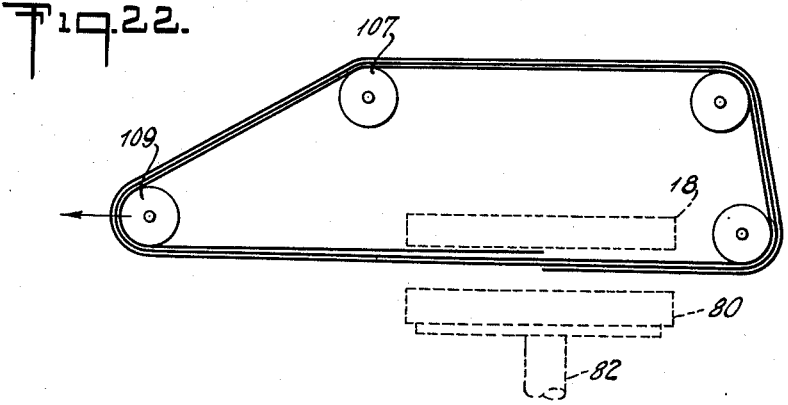

Patented Aug. 4, 1953

2,647,554

UNITED STATES PATENT OFFICE 2,647,554

HYDRAULICALLY OPERATED VULCANIZING PRESS

Herman Hugo Otto Grieshammer, Easton, Pa., assignor to Victor Balata & Textile Belting Co., Easton, Pa., a corporation of Pennsylvania Application September 1, 1950, Serial No. 182,793

7 Claims. (Cl. 154—1)

This invention is a vulcanizing press, particularly for bonding together under heat and pressure the overlapping ends of belting, although capable of other analogous uses.

The press comprises essentially a horizontally movable upper platen and a vertically movable lower platen. The upper platen is movable back and forth in a horizontal plane, being supported at one side thereof so that in the "open" position one end of the platen is entirely clear, so that a belt before and after vulcanization or bonding can be slipped over the free end of this upper platen. As the upper platen reaches its operative or "closed" position, its free end engages under a horizontal abutment, which abutment serves to resist the upward pressure of the lower platen. The lower platen is movable up and down vertically by one or more hydraulic rams and in its uppermost position presses against the upper platen directly above it.

An important feature of the invention is that the press may be controlled automatically or manually to carry through the following cycle of operations:

1. With the upper platen retracted and the lower platen lowered, the upper platen moves horizontally until it engages under an abutment.

2. When the upper platen reaches this extended or operative position it operates mechanism for initiating the raising of the lower platen. The lower platen rises until it engages the upper platen and when in its fully raised position, operates mechanism for preventing any movement of the upper platen, so that there is no possibility of the upper platen being retracted while the lower platen is in engagement therewith.

3. After the two platens have subjected the belt pressed between them for the completion of the bonding operation, the lower platen is lowered by either manual or automatic means.

4. After the lower platen has moved downwardly out of engagement with the upper platen, the lower platen operates mechanism for moving the upper platen back to its starting position.

The upper platen is moved back and forth by hydraulic means, controlled by a pair of cooperating spring loaded diaphragm valves, which operate alternately to apply pressure to the opposite sides of a piston which moves the upper platen back and forth in its horizontal path.

The lower platen is controlled by a spring loaded diaphragm valve of a well known type. This valve is a two pressure hydraulic operating valve, to which high pressure and low pressure liquid is supplied, and which valve will apply high pressure or low pressure liquid as desired, to the lower platen.

The press frame includes two pairs of supporting standards, defining between them the operating zone for the two platens.

One pair of standards, together with other supporting framework, supports two horizontally movable beams, movable on suitable rollers, the upper platen being carried by the underside of these beams. These beams are strongly supported in the press framework and are operated, as mentioned, to project the upper platen toward the other pair of supporting standards. This other pair of supporting standards carries a horizontal beam or abutment under which the free ends of the horizontal beams engage, and are thereby positioned to resist the heavy upward pressure from the lower platen.

The lower platen is positioned between the two described pairs of supporting standards and is raised and lowered vertically by one or more rams, supplied with either high pressure fluid or low pressure fluid as may be desired.

The valves for controlling the operation of the press may be controlled by a known type of drum type controller, which is arranged to control the press so that it goes through its cycle automatically. A manual control, however, cooperates with the automatic control, so that the control may be manual, if desired.

The invention will now be described in connection with the accompanying drawings, illustrating the preferred embodiment of the invention, wherein:

Fig. 1 is a side view of the press of this invention.

Fig. 2 is an end view looking from the left of Fig. 1.

Fig. 3 is an end view looking from the right of Fig. 1.

Fig. 4 is a sectional view, enlarged, taken on the line 4—4 of Fig. 1.

Fig. 5 is a diagrammatic view showing air and water connections for various parts of the press.

Fig. 10 is a side view showing two belts being vulcanized at the same time.

Fig. 11 is a perspective view showing a belt being vulcanized.

Figs. 12, 13, 14 and 15 are views showing the type of spliced or bonded joint particularly useful in making a belt.

Fig. 16 is an enlarged side view of the diaphragm valves for controlling the operation of the upper platen.

Fig. 17 is a vertical sectional view of a main control valve.

Fig. 18 is an enlarged view, partly in section, showing the valves which are controlled by the upper and lower platens.

Fig. 19 is a sectional view showing the high pressure-low pressure valve for operating the lower platen.

Figs. 20, 21 and 22 are diagrammatic side views showing the press being used for making a multiply belt of a particular length.

Figure 6:
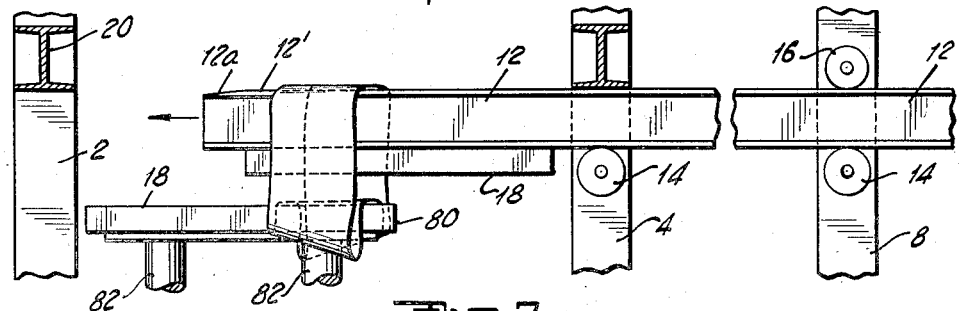
Figs. 6, 7, 8 and 9 are diagrammatic side views showing sequential operating positions of the platens.

Referring now to these drawings, the press comprises a pair of vertical standards 2 and a pair of vertical standards 4 and connecting bottom beams 6. The beams 6 are extended and secured to another pair of vertical standards 8. Horizontally extending upper beams 10 complete the main framework of the press.

A pair of horizontally extending platen-carrying beams 12 are mounted to move back and forth in a horizontal path toward and away from the standards 2 at the left of the press. These beams 12 are positioned between lower rollers 14 and upper rollers 16 carried by standards 4 and 8. The beams 12 carry the upper platen 18 on the underside thereof. The platen 18 is heated by steam or the like through the usual inlet and outlet pipes 19.

Standards 2 support a horizontally extending abutment beam 20, the lower surface of which is at substantially the same level as the upper surfaces 12' of the beams 12. When the beams 12 move to the left, Fig. 1, the ends of beams 12 engage under the abutment 20; the outer top portion of such beams may be beveled as indicated at 12a so as to avoid hitting the lower edge of beam 20.

Beams 12 and upper platen 18 are moved back and forth by hydraulic means comprising a cylinder 22 containing the usual piston, and piston rod 24 connected by the bracket 26 to beams 12.

Water or other fluid under pressure is applied alternately at one end or the other of cylinder 22 by pressure pipes 28 and 30. Pipe 28 is connected to a known type of spring and air operated three-way diaphragm valve 32, Fig. 16. This valve 32 is provided with a pressure inlet pipe 34 and pressure release or drain pipe 36. The other pipe 30 for the cylinder 22 is connected to a similar valve 38, into which valve 38 is connected a liquid pressure inlet 40 and pressure release or drain pipe 42. The two valves 32 and 38 are connected by an air pipe 44 to a pipe 46. The lower portion of each valve is connected to the air pressure line 47, supplying an operating pressure of about 25 pounds.

Air for operating the valves already described and other valves to be described, comes in through a pipe 50 in which is positioned a filter 51, valve 52 and safety valve 53. The air then passes through pipe 54 through an emergency box 56 containing a manually operated valve which can be quickly shut if necessary. The air then passes through a pipe 57 to a two-way connection 58 and through pipe 59 provided with a manually operated hand valve 60 for supplying air through pipe 61 to a main control valve 62. Valve 62 is a spring operated diaphragm valve of a well known type. Another pipe 63 from connection 58 passes into an automatic timer 64 which turns on or shuts off the air pressure in accordance with the setting of the timer, the timer being connected through pipe 65 to the main control valve 62.

The timer 64 is a standard article of manufacture, containing a continuously rotating drum or cylinder. The electrical leads for the timer 64 may be provided with the usual switches 66 and 67 for controlling it.

Air from the pressure line 54 is supplied to control valve 62 by a pipe 70.

When the press is open, as in Fig. 1, and pressure is applied to valve 62 by pipe 65, either manually by operation of valve 60, or automatically by operation of timer 64; air pressure is supplied by pipe 47 to valves 32 and 38. At this stage, valve 32 is reversed from the position of Fig. 16, so that no pressure is applied to line 28 connected to cylinder 22. The other valve 38 at this stage applies pressure through pipe 30 to cylinder 22, to move the piston rod 24 to the left to move the beams 12 and upper platen to the left, to the closed position as shown by the dotted lines in Fig. 1 and in Fig. 7. When the pressure on valve 62 is released, the pressure on valves 32 and 38 is released, the springs in the valves reverse the valve positions, so that 32 applies pressure through pipe 28 to cylinder 22, valve 38 opening pipe 30 from the cylinder 22 to drain 42, whereby the beams 12 and upper platen are moved to the right to open the press.

Bumpers 74 carried by beams 12, cooperate with cushions 76 on standards 4 and 8 to cushion the beams 12 at either end of their stroke.

With the upper platen now in the closed position, the lower platen 80 is raised by hydraulic rams 82 working in cylinders 84, into engagement with the upper platen. This movement is effected automatically as follows: Upper platen 18, when it reaches closed position, engages a valve 86, Fig. 18, positioned on standard 2 of the press, which valve is normally closed. It is opened by lever 87, adapted to be engaged by platen 18 to open the valve. This admits air under pressure from pressure pipe 88 to pipe 89 to a known type of two-stage conventional spring operated diaphragm valve, indicated generally at 90, Fig. 19. This two stage valve 90 is supplied with low pressure liquid by pipe 91 and high pressure liquid by pipe 92, the latter carrying hand operated valve 93. Valve 90 is connected by pipe 94 to the hydraulic cylinders 84.

Figure 7:
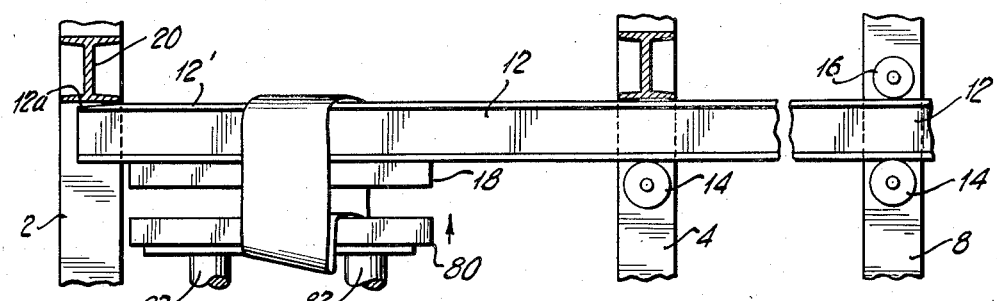

When the upper platen reaches closed position as in Figs. 7 and 18, it opens valve 86, air is supplied to valve 90, which opens and supplies liquid under pressure to pipe 94 to the cylinders 84 to raise the lower platen 80. If low pressure is desired valve 93 is closed; if high pressure is desired, valve 93 is opened; valve 90 is designed to allow the pressure to build up gradually, through the use of the known spring loaded high pressure inlet valve 95, forming part of valve 90, Fig. 19; when the pressure builds up to a definite amount, valve 95 is opened to admit liquid under high pressure from pipe 92; check valve 96 prevents the high pressure liquid from entering the low pressure line 91.

Figure 8:
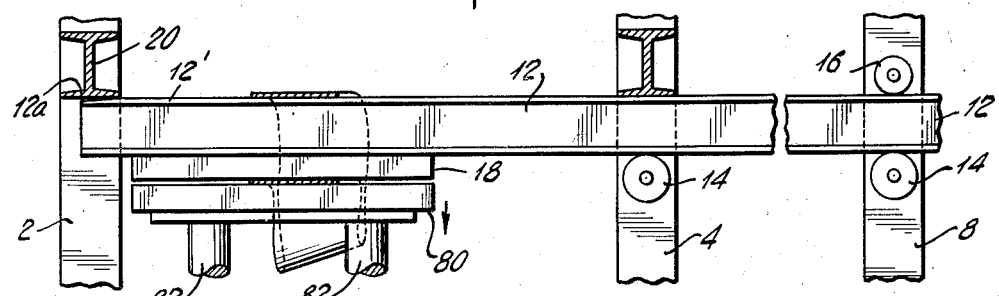
Figure 9:
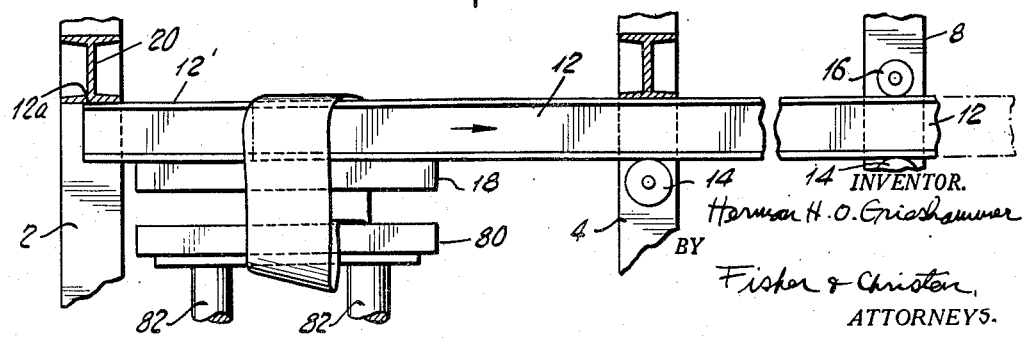

With the belt or the like between the upper and lower platens, the lower platen moves upwardly as just described into contact with the upper platen, as in Fig. 8. When the lower platen 80 reaches its position against the upper platen, a fixed cam 97, Figs. 5 and 18, carried by the lower platen engages lever 98 of the normally open valve 99 to close it, thereby shutting off the air in pipe 100 and shutting off the air in pipe 46, connected as described to the operating valves 32 and 38, Fig. 5, for controlling the piston 24 for operating the upper platen. Therefore, when the two platens are in contact under pressure, the upper platen cannot be moved, because the control valves 32 and 38 are immobilized.

The press remains closed as determined by controller 64 for the desired interval, for effecting the bonding operation. Then the controller 64 operates valve 62 to shut off the air pressure in pipes 88 and 89, relieving valve 90 which controls the lower platen, pressure is relieved on the lower platen and it descends by gravity. Cam 97, carried by the lower platen, Figs. 5 and 18, disengages valve lever 98, valve 99 opens, and air under pressure is supplied to pipe 46 for reversing valves 32 and 38 for thereby retracting the upper platen and moving it back to starting position. Valve 62 can also be controlled manually, by handle 60, instead of by the controller 64, to open the press described above.

In forming a belt, a strip of laminated material 101 or 102, Figs. 14 and 15, composed usually of 2 to 8 layers, is cut diagonally, skived to expose the several layers in stepped formation, the bonding liquid or emulsion applied, the joint is placed between the platens, the platens then going through the described cycle to subject the joint to the necessary heat and pressure to bond the ends to complete the belt, which is readily removed when the upper platen is retracted, Fig. 6, to clear one end of such platen.

Figs. 20, 21 and 22 illustrate diagrammatically another way of using the press of this invention, particularly for forming a laminated endless belt of a particular length. A plurality of guide and feed rollers 105, 106 and 107 is provided for guiding and holding a strip 108 between the platens 18 and 80 and around the upper platen 18. A fourth roller 109 is provided, which roller by means of a piston 110 working in a conventional hydraulic cylinder 111, may be moved outwardly to apply tension in a desired amount to the belt. A strip 108, from a supply roll, is coated with a suitable bonding agent and passed around the rollers a number of times, until the desired number of layers or laminations have been built up. The ends of the strip are cut and spliced and then the belt is stretched to the proper length by the roller 109. While so held, the press is closed and the plies bonded together under heat and pressure, the belt being moved along step by step so that the entire area of the belt has been subjected to the bonding operation.

While the invention has been described in some detail, it should be understood that the invention is not to be limited to the details shown, but may be carried out in other ways.

I claim as my invention:

1. A vulcanizing press of the character described, comprising a first platen, hydraulic means for moving said platen vertically, a first set of vertically extending supporting standards positioned at one side of said platen, horizontally projecting, horizontally movable beams carried by said supporting standards, a second platen carried by said beams and positioned thereon entirely at one side of said supporting standards, means for advancing and retracting said horizontal beams and the platen carried thereby, the ends of the projecting beams, and one end of the platen carried thereby, projecting into the press, above said vertically movable first platen, and being entirely clear and unobstructed in the retracted position, a second set of vertically extending supporting standards positioned at the opposite side of said vertically movable first platen with respect to said first set of standards, said second set of standards having a horizontally extending abutment with which the projecting ends of said horizontally movable beams are adapted to engage when in the advanced or operative position, said clear and unobstructed ends of the horizontal beams and the platen carried thereby, when in the retracted position, permitting the removal therefrom of a closed loop article formed by vulcanizing between said platens.

2. The combination as set forth in claim 1, further including control means actuated by said horizontally movable beams when in engagement with said abutment, for moving said vertically movable platen into engagement with the other platen.

3. The combination as set forth in claim 1, further including control means actuated by said horizontally movable beams when in engagement with said abutment, for moving said vertically movable platen into engagement with the other platen and manually controlled means for moving both platens back to their initial starting positions.

4. The combination as set forth in claim 1, further including pressure responsive valve means for supplying high or low pressure, as desired, to the hydraulic means for actuating the vertically movable platen.

5. The combination as set forth in claim 1, wherein said hydraulic means for moving the platen vertically comprises a multi-way valve operatively connected therewith, a valve connected with said multi-way valve, and positioned for actuation when said horizontal beams reach their advanced or operative position, to actuate said multi-way valve to cause it to supply hydraulic pressure for raising the platen vertically.

6. The combination of claim 1, wherein said means for advancing and retracting the horizontal beams includes a pair of multi-way valves operatively connected therewith; a third multi-way valve, connected with said pair of multi-way valves, for controlling said hydraulic means for moving said first platen vertically; valve means actuated by said horizontal beams reaching the closed position, for actuating said third multi-way valve to apply hydraulic pressure to move said first platen vertically to close the press; and manually controlled valve means connected to said third multi-way valve to reverse its operation to relieve the hydraulic pressure and move the first platen to the open position.

7. The combination of claim 6, further including valve means operatively connected to said pair of multi-way valves and actuated when said first platen is moved to the open position to move the horizontal beams and the second platen to the open position.

HERMAN HUGO OTTO GRIESHAMMER.

References Cited in the file of this patent
UNITED STATES PATENTS

| Number | Name | Date |
| --- | --- | --- |
| 1,242,365 | Nall | Oct. 9, 1917 |
| 2,009,487 | Ernst et al. | July 30, 1935 |
| 2,160,805 | Winegar | June 6, 1939 |
| 2,171,511 | Winegar | Aug. 29, 1939 |
| 2,444,339 | Dinzel | June 29, 1948 |
| 2,508,301 | Stacy | May 16, 1950 |